United States Patent
Good et al.

(10) Patent No.: US 11,970,269 B2
(45) Date of Patent: Apr. 30, 2024

(54) ASSEMBLIES FOR AIR VEHICLE CONTROL SURFACES INCLUDING A BULLNOSE

(71) Applicant: The Boeing Company, Arlington, VA (US)

(72) Inventors: Mark S. Good, Seattle, WA (US); Kevin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/744,272

(22) Filed: May 13, 2022

(65) Prior Publication Data

US 2023/0365250 A1    Nov. 16, 2023

(51) Int. Cl.
*B64C 9/34* (2006.01)
*B64C 9/16* (2006.01)

(52) U.S. Cl.
CPC . *B64C 9/34* (2013.01); *B64C 9/16* (2013.01)

(58) Field of Classification Search
CPC .... B64C 9/34; B64C 9/02; B64C 9/06; B64C 9/16; B64C 9/18; B64C 9/20
See application file for complete search history.

(56) References Cited

U.S. PATENT DOCUMENTS

| | | |
|---|---|---|
| 8,038,103 B2 | 10/2011 | Lacy et al. |
| 9,815,570 B2 | 11/2017 | Anderson |
| 2005/0011994 A1* | 1/2005 | Sakurai .................... B64C 9/16 244/212 |
| 2013/0301049 A1 | 11/2013 | Teague |
| 2019/0283863 A1 | 9/2019 | Bowers et al. |
| 2019/0389561 A1* | 12/2019 | Mokhtarian ............. B64C 9/08 |
| 2021/0101671 A1 | 4/2021 | Tsai et al. |
| 2023/0026667 A1 | 1/2023 | Walker et al. |

OTHER PUBLICATIONS

United States Patent and Trademark Office, "Non-Final Office Action," issued in U.S. Appl. No. 17/751,209 dated Jun. 14, 2023, 8 pages.
United States Patent and Trademark Office, "Notice of Allowance and Fee(s) Due," issued in connection with U.S. Appl. No. 17/751,209, mailed on Sep. 22, 2023, 8 pages.

* cited by examiner

*Primary Examiner* — Brady W Frazier
*Assistant Examiner* — Shanna Danielle Glover
(74) *Attorney, Agent, or Firm* — Hanley, Flight & Zimmerman, LLC

(57) ABSTRACT

Assemblies for air vehicle control surfaces and related methods are disclosed. An example apparatus includes a control surface; a bullnose carried by the control surface, the bullnose moveable relative to the control surface; a first actuator operatively coupled to the control surface to cause the control surface to rotate; and a second actuator operatively coupled to the control surface, the second actuator to cause the bullnose to move from a first position to a second position to cause an opening to be formed relative to the control surface, the movement of the bullnose independent of rotation of the control surface.

20 Claims, 12 Drawing Sheets

ASSEMBLIES FOR AIR VEHICLE CONTROL SURFACES INCLUDING A BULLNOSE

FIELD OF THE DISCLOSURE

This disclosure relates generally to air vehicles and, more particularly, to assemblies for air vehicle control surfaces and related methods.

BACKGROUND

An air vehicle such as a fixed-wing aircraft includes control surfaces coupled to a wing of the aircraft that are selectively actuated to affect behavior of the aircraft during flight and/or landing. A flap coupled to the wing can be lowered to affect lift. An aileron coupled to the wing may be deflected upward or downward to control roll of the aircraft.

SUMMARY

An example apparatus includes a control surface; a bullnose carried by the control surface, the bullnose moveable relative to the control surface; a first actuator operatively coupled to the control surface to cause the control surface to rotate; and a second actuator operatively coupled to the control surface, the second actuator to cause the bullnose to move from a first position to a second position to cause an opening to be formed relative to the control surface, the movement of the bullnose independent of rotation of the control surface.

An example aircraft includes a wing; a flaperon moveably coupled to a trailing edge of the wing; a bullnose supported by the flaperon; a first actuator operatively coupled to the flaperon to cause the flaperon to move between an upward deflected position and a downward deflected position relative to the wing; and a second actuator operatively coupled to the bullnose to cause the bullnose to move relative to the flaperon from a stowed position to a retracted position to cause an opening to be defined between the flaperon and the wing, the first actuator and the second actuator carried by the wing.

An example system includes a control surface; a bullnose moveable relative to the control surface; a first actuator operatively coupled to the control surface; a second actuator operatively coupled to the bullnose; memory; machine-readable instructions; and processor circuitry to execute the machine-readable instructions to cause the first actuator to rotate the control surface between a neutral position and a downward deflected position relative to the neutral position; and cause the second actuator to move the bullnose from an extended position to a retracted position to create an opening relative to the control surface when the control surface is in the downward deflected position.

Figure 1:
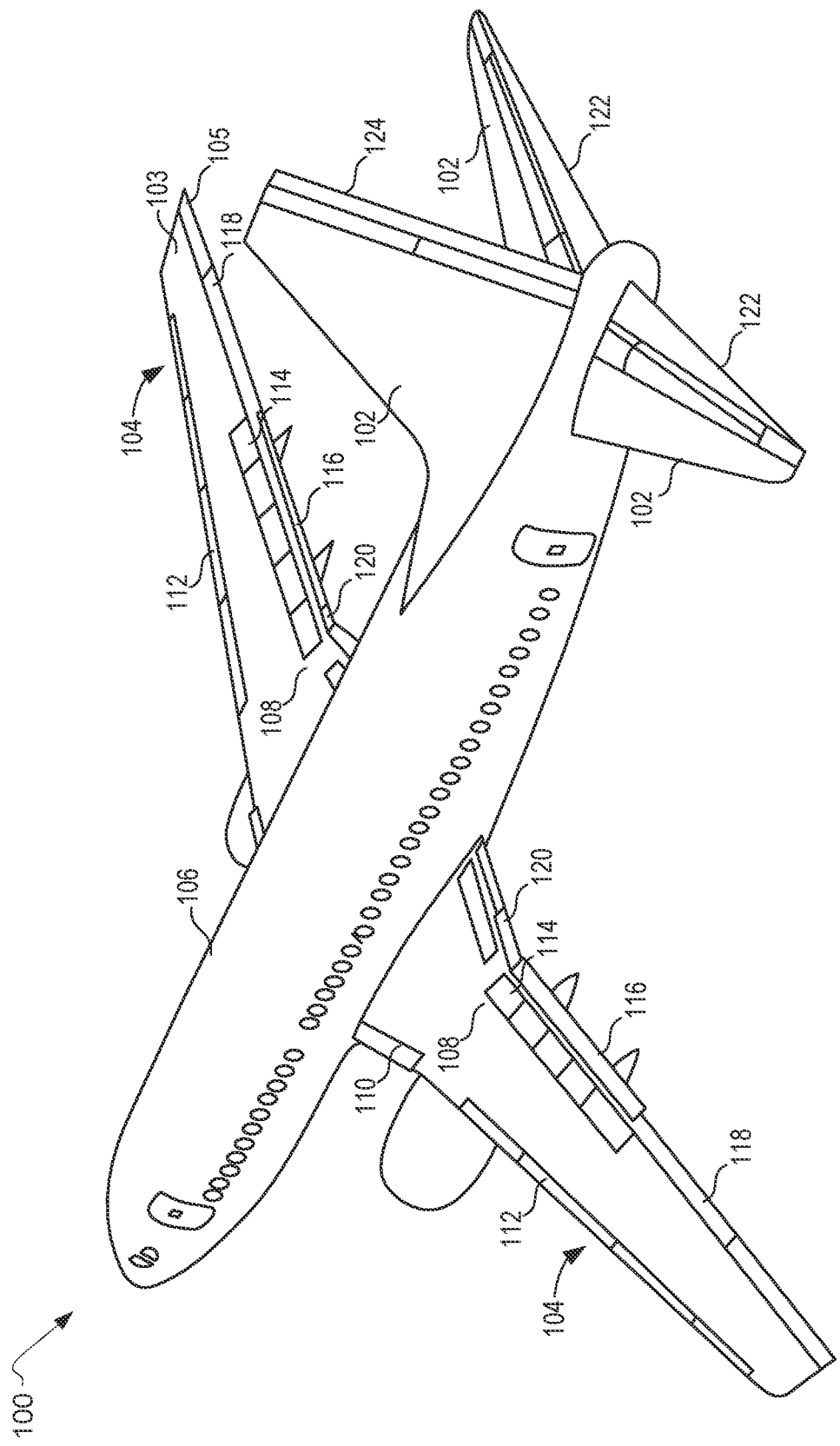
FIG. 1 illustrates an example air vehicle in which examples disclosed herein may be implemented

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An air vehicle such as a fixed-wing aircraft includes control surfaces coupled to a wing of the aircraft. The control surfaces are selectively actuated to affect behavior of the aircraft during flight and/or landing. For instance, a flap coupled to the wing can be lowered to change a shape of the wing, and, thus, the angle of attack and resulting lift. An aileron coupled to the wing may be deflected upward or downward to control roll of the aircraft. A flaperon can be used to affect roll and lift, thereby performing functions associated with a flap and an aileron.

Some known control surfaces (e.g., flaps and/or flaperons) are slotted such that a gap can be selectively formed between the control surface and the wing to enable high pressure air from below to the wing to flow through the gap and over the upper surface of the control surface. The airflow through the gap can energize air flowing over the surface of the control surface (i.e., a boundary layer), thereby increasing lift as a result. In some known slotted flaps and/or flaperons, a hinge line about which the flap rotates when the flap is lowered is located below the wing. Fairings can be added to cover the flap hinge to reduce drag. However, the inclusion of fairings to cover the flap hinge below the wing can still introduce drag penalties that can affect, for instance, supersonic flight.

Some known slotted flaps include a door that opens to further increase a size of the gap formed between the wing and the flap to increase airflow. However, the inclusion of components such as a door can introduce additional structural complexities as well as drag penalties. Some known slotted flaps include an actuator carried by the flap to control the door. However, the actuator may be subject to size and/or weight restrictions in view of design constraints of the control surface. Also, wiring to provide power for the actuator is routed from the wing across the flap hinge, which can introduce complexities with respect to installation and maintenance of the actuator.

Disclosed herein are example control surface assemblies that increase lift capabilities of control surfaces such as flaps or flaperons. Examples disclosed herein include a control surface and a bullnose to move relative to the control surface. Movement of the bullnose creates an opening or gap between the wing and the control surface. High pressure air from beneath the wing can flow through the opening to energize airflow over the wing, thereby increasing lift. In examples disclosed herein, a first actuator controls rotation of the control surface. A second actuator controls movement of the bullnose independent of rotation of the control surface. As a result, the movement of the bullnose during rotation of the control surface is prevented or substantially prevented, thereby reducing interference and/or drag with respect to airflow over the control surface.

In examples disclosed herein, the actuators are supported by the wing of the air vehicle. Contrary to some known slotted flaps, in examples disclosed herein, the hinge line of the control surface does not move below the wing, which eliminates or reduces the need for additional fairings. In some examples, one or more of the actuators is coupled to a rib of the wing rather than carried by the control surface, which provides for weight reduction at the control surface. Further, wiring to provide power and/or to communicate instructions to the actuators does not extend across the hinge of the flap, but instead, remains within the wing. As a result, examples disclosed herein provide control surface assemblies having reduced complexity while increasing lift capabilities of control surfaces.

FIG. 1 illustrates an example aircraft 100 in which the examples disclosed herein may be implemented. In the illustrated example, the aircraft 100 includes stabilizers 102 and wings 104 coupled to a fuselage 106. The wings 104 define upper and lower surfaces (e.g., upper and lower sides, upper and lower aerodynamic surfaces, etc.) 103, 105, respectively. The wings 104 of the aircraft 100 have control surfaces 108 located along the leading and/or trailing edges of the wings 104. The control surfaces 108 may be displaced or adjusted (e.g., angled, etc.) to provide lift during takeoff, landing, and/or flight maneuvers. In some examples, the control surfaces 108 are operated (i.e., displaced) independently of one another. The control surfaces 108 include leading edge flaps 110, leading edge slats 112, upper spoilers 114 (e.g., flight spoilers, ground spoilers, upper surface spoilers, etc.), and trailing edge flaps (e.g., rotatable flaps) 116. The control surfaces 108 of the illustrated example also include ailerons 118 and flaperons 120. In this example, the stabilizers 102 include elevators 122 and a rudder 124.

To control flight of the aircraft 100, the upper surface spoilers 114 of the illustrated example alter the lift and drag of the aircraft 100. The flaps 116 alter the lift and pitch of the aircraft 100. The ailerons 118 and the flaperons 120 of the illustrated example alter the roll of the aircraft 100. In this example, the slats 112 alter the lift of the aircraft 100. The control surfaces 108 of the illustrated example also play a role in controlling the speed of the aircraft 100. For example, the upper surface spoilers 114 may be used for braking of the aircraft 100. Any of the control surfaces 108 of the illustrated example may be independently moved (e.g., deflected) to control the load distribution in different directions over the respective wings 104, thereby directing movement of the aircraft 100.

For illustrative purposes, examples disclosed herein are discussed in connection with the flaperons 120. However, the examples disclosed herein may be applied to control surfaces associated with any of the stabilizers 102, the wings 104, and/or any other exterior or outboard structure (e.g., a horizontal stabilizer, a wing strut, an engine strut, a canard stabilizer, etc.) of the aircraft 100. In particular, the wings 104 and/or the stabilizers 102 may have control surfaces 108 (e.g., the flaps 116) that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100. Thus, the discussion of examples disclosed herein in connection with the flaperons 120 is for illustrated purposes only and does not limit the examples to use only with flaperons.

Figure 2:
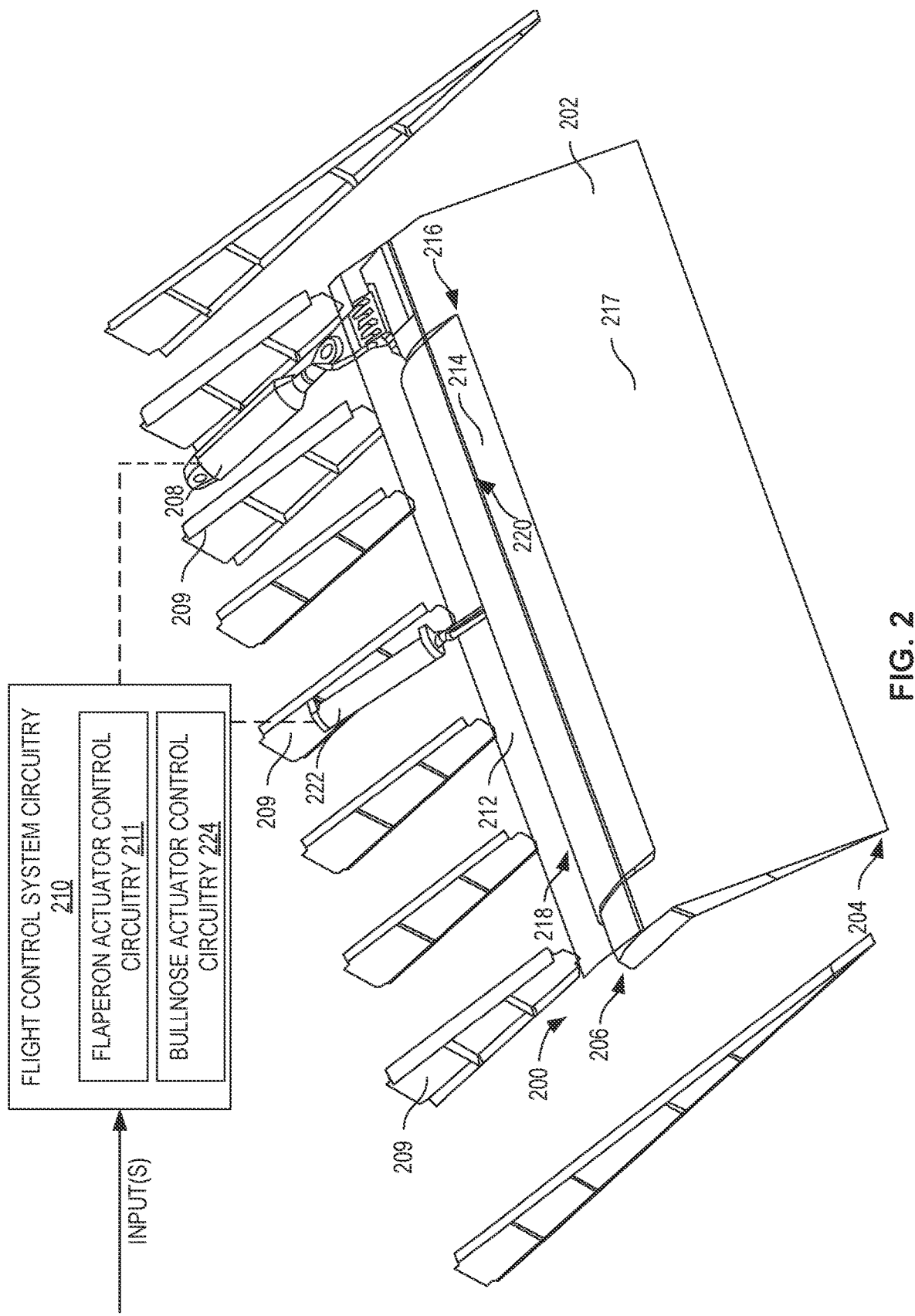
FIG. 2 illustrates an example system including a control surface assembly and flight control system circuitry for controlling one or more actuators of the example control surface assembly in accordance with teachings of this disclosure.

FIG. 2 illustrates an example control surface assembly 200 in accordance with teachings of this disclosure. The example control surface assembly 200 of FIG. 2 includes a flaperon 202 (e.g., the flaperon 120 of FIG. 1). The example flaperon 202 includes a first end 204 corresponding to a trailing edge of the flaperon 202 and a second end 206 opposite the first end 204 and corresponding to a leading edge of the flaperon 202. The second end 206 of the flaperon 202 is moveably coupled to a wing (e.g., the wing 104 of FIG. 1) proximate to a trailing edge of the wing. For instance, a flap hinge 700 (FIG. 7) can be supported by a spar of the wing, skin of the wing, etc.

The example control surface assembly 200 includes a first actuator 208 operatively coupled to the flaperon 202. The first actuator 208 controls movement (e.g., rotation) of the flaperon 202. The first actuator 208 can be disposed between (e.g., pivotably mounted between) two ribs 209 of the wing. A location of the first actuator 208 relative to the flaperon 202 can differ from the example shown in FIG. 2. In operation, the first end 204 of the flaperon 202 deflects upward or downward relative to the wing (e.g., relative to the upper surface 103 of the wing 104 of FIG. 1) via the first actuator 208. Put another way, the first actuator 208 causes the first end or trailing edge 204 of the flaperon 202 to move toward or away from a ground surface. The first actuator 208 can have one or more chambers and include, for example, a linear actuator, a hydraulic actuator, an electric actuator, a pneumatic actuator, etc.

The first actuator 208 of the control surface assembly 200 of FIG. 2 is communicatively coupled to flight control system circuitry 210 (e.g., processor circuitry). The example flight control system circuitry 210 of FIG. 2 includes flaperon actuator control circuitry 211. The flaperon actuator control circuitry 211 outputs instructions for the first actuator 208 based on input(s) received at the flight control system circuitry 210 (e.g., input(s) from a pilot of the air vehicle). The first actuator 208 causes the flaperon 202 to pivot or rotate based on the instructions from the flaperon actuator control circuitry 211.

In the example of FIG. 2, a drooping panel or shroud 212 is disposed proximate to the second end 206 of the flaperon 202. The shroud 212 can be supported by one or more of the ribs 209 of the wing. As illustrated in FIG. 2, the shroud 212 covers a portion of the flaperon 202 including the second end 206 of the flaperon 202 to promote smooth airflow over the flaperon 202. For illustrative purposes, the shroud 212 is shown as transparent in FIGS. 2-14C.

The example control surface assembly 200 of FIG. 2 includes a bullnose 214. The bullnose 214 serves as a moveable leading edge panel of the flaperon 202. The bullnose 214 has a first end 216 and a second end 218. In FIG. 2, the bullnose 214 is shown in a first, stowed, or extended position in which the second end 218 of the bullnose 214 is disposed proximate to the second end 206 of the flaperon 120 and at least a portion of the bullnose 214 is covered by the shroud 212. As disclosed herein, the bullnose 214 can move from the first position shown in FIG. 2 to a second or retracted position in which the bullnose 214 moves aftward or away from the leading edge 206 of the flaperon 202 along a surface 217 of the flaperon 202 toward the first end or trailing edge 204 of the flaperon 202. As a result of translation of the bullnose 214 (e.g., via roller(s) (FIG. 9)), an opening is formed between an end 220 of the shroud 212, the second end 218 of the bullnose 214, and the second end 206 of the flaperon 202. The bullnose 214 can be retracted when, for instance, the first end 204 of the flaperon 202 is deflected downward relative to the wing to create the opening and increase lift as result of airflow through the opening.

The example control surface assembly 200 of FIG. 2 includes a second actuator 222 operatively coupled to the bullnose 214 to control movement the bullnose 214 between the extended and retracted positions. The second actuator 222 can include, for example, a pneumatic linear actuator. The second actuator 222 is communicatively coupled to the flight control system circuitry 210. The example flight control system circuitry 210 of FIG. 2 includes bullnose actuator control circuitry 224. The bullnose actuator control circuitry 224 causes the bullnose 214 to move between the extended and retracted positions based on instructions from the flight control system circuitry 210 (e.g., in response to user input(s) received by the flight control system circuitry 210).

In the example of FIG. 2, the second actuator 222 is coupled to (e.g., fixedly coupled) one of the ribs 209 of the wing. The second actuator 222 can be coupled to the rib 209 via mechanical fasteners. The second actuator 222 can be coupled to a different one of the ribs 209 than shown in FIG. 2. In the example of FIG. 2, the coupling of the second actuator 222 to the rib 209 provides for increased support and/or stability of the second actuator 222 as compared to if the second actuator 222 was carried by, for instance, a surface of the flaperon 202. For example, the rib 209 can have an increased thickness to support the second actuator 222 as compared to the flaperon 202. Further, the coupling of the second actuator 222 to the rib 209 can prevent interference between the second actuator 222 and the flaperon 202 and/or between the second actuator 222 and other mechanical or electrical components of the wing. For example, wiring associated with the second actuator 222 remains within the wing and does not extend across the hinge of the flaperon 202 because the second actuator 222 is spaced apart from the flaperon 202. Also, the second actuator 222 does not interfere with performance the first actuator 208. However, the second actuator 222 could be carried or supported by the wing and/or the control surface assembly 200 in other ways. For instance, the second actuator 222 could be pivotably mounted between two of the ribs 209. Although one actuator 222 is shown in FIG. 2 for controlling the bullnose 214, in some examples, the control surface assembly 200 includes more than one bullnose actuator.

Figure 3:
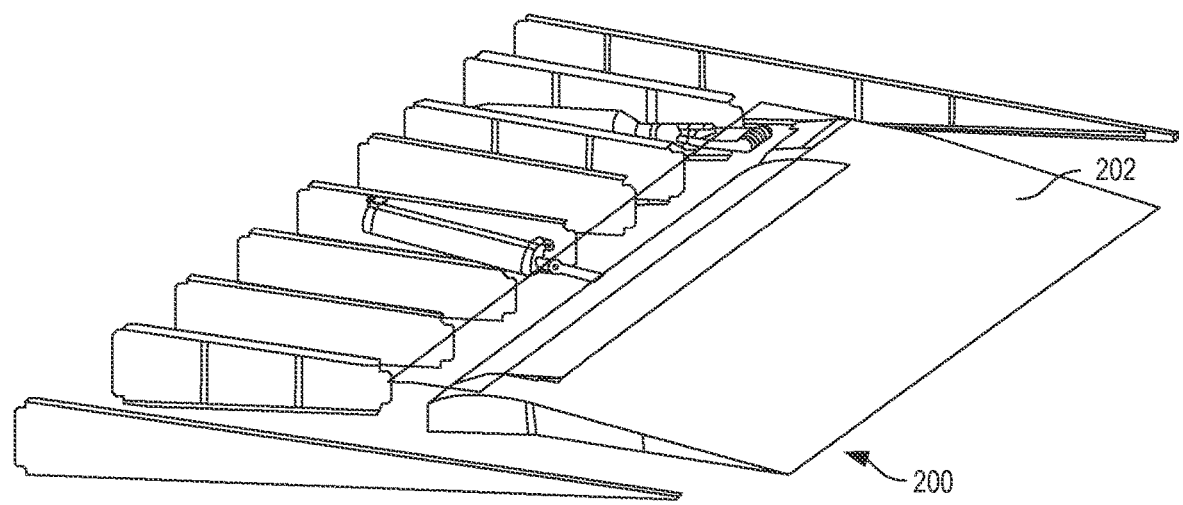
FIGS. 3-6 illustrate example positions of a control surface and a bullnose of the example control surface assembly of FIG. 2.

FIG. 3 illustrates the example control surface assembly 200 of FIG. 2 in which the flaperon 202 is in a first or neutral position. In the first or neutral position, the flaperon 202 is neither rotated upward nor downward relative to, for instance, a surface of a wing (e.g., the upper surface 103 of the wing 104 of FIG. 1) including the control surface assembly 200.

Figure 4:
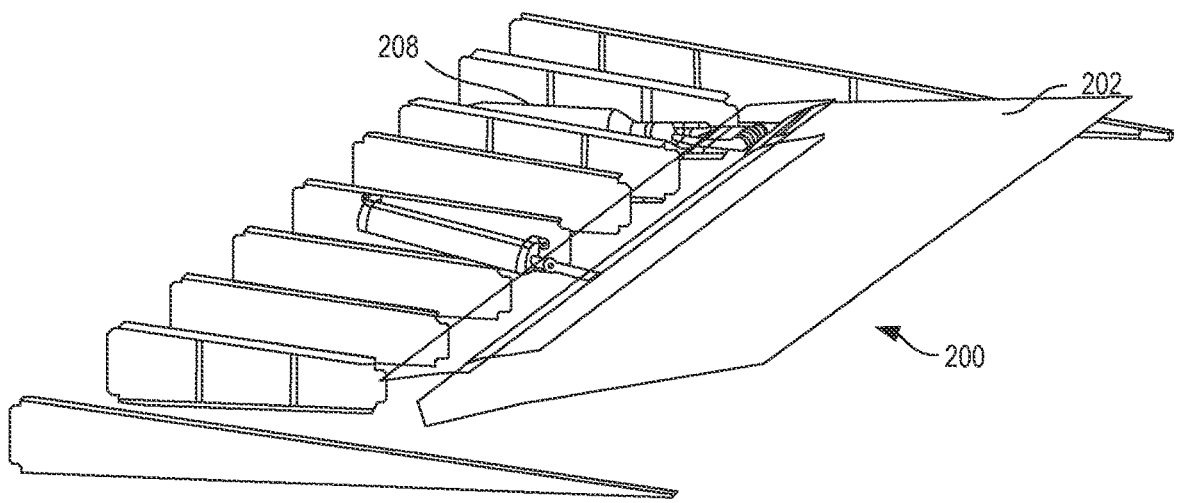

FIG. 4 illustrates the flaperon 202 of the example control surface assembly 200 in a second position in which the flaperon 202 is rotated (e.g., deflected, pivoted) upward as compared to the first or neutral position of FIG. 3. In the example of FIG. 4, the first actuator 208 causes the flaperon 202 to deflect upward in response to instructions from the flaperon actuator control circuitry 211 of the flight control system circuitry 210 (FIG. 2) to, for instance, affect roll of the aircraft.

Figure 5:
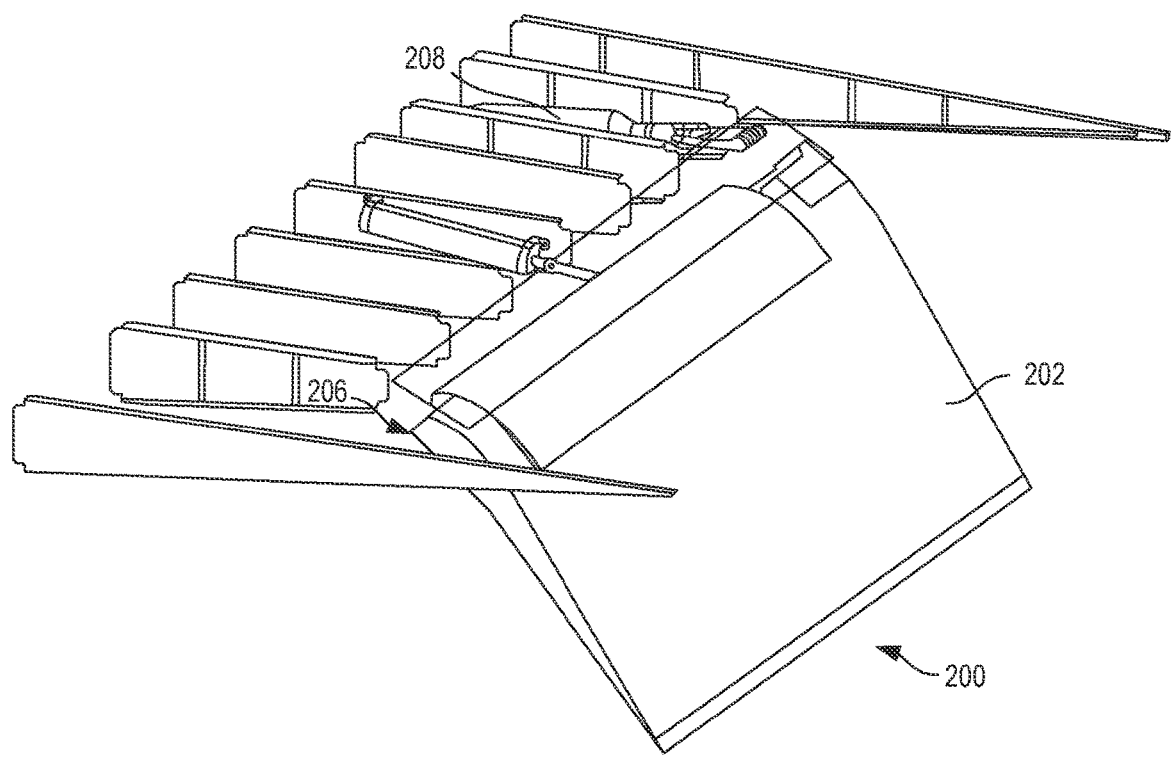

FIG. 5 illustrates the flaperon 202 of the example control surface assembly 200 in a third position in which the flaperon 202 is deflected downward as compared to the first or neutral position of FIG. 3. In the example of FIG. 5, the first actuator 208 causes the flaperon 202 to deflect downward in response to instructions from the flaperon actuator control circuitry 211 of the flight control system circuitry 210 (FIG. 2). Deflecting the flaperon 202 downward changes the angle of attack and, as result, affects lift of the aircraft.

As illustrated in FIGS. 3-5, the bullnose 214 of the example control surface assembly 200 remains in the stowed or extended position when the flaperon 202 is in the first or neutral position of FIG. 3, the second or upward deflected position of FIG. 4, and the third or downward deflected position of FIG. 5. In particular, in the examples of FIGS. 3-5, the second actuator 222 has not caused the bullnose 214 to retract, or move away from the leading edge 206 of the flaperon 202. For instance, the second actuator 222 may have not (yet) have received commands from the bullnose actuator control circuitry 224 of the flight control system circuitry 210 (FIG. 2) instructing the second actuator 222 to cause the bullnose 214 to retract. Thus, in examples disclosed herein, movement of the bullnose 214 via the second actuator 222 is independent of rotation of the flaperon 202 via the first actuator 208. Therefore, failure conditions at one of the first actuator 208 or the second actuator 222 are isolated from the other of the first actuator 208 or the second actuator 222.

Figure 6:
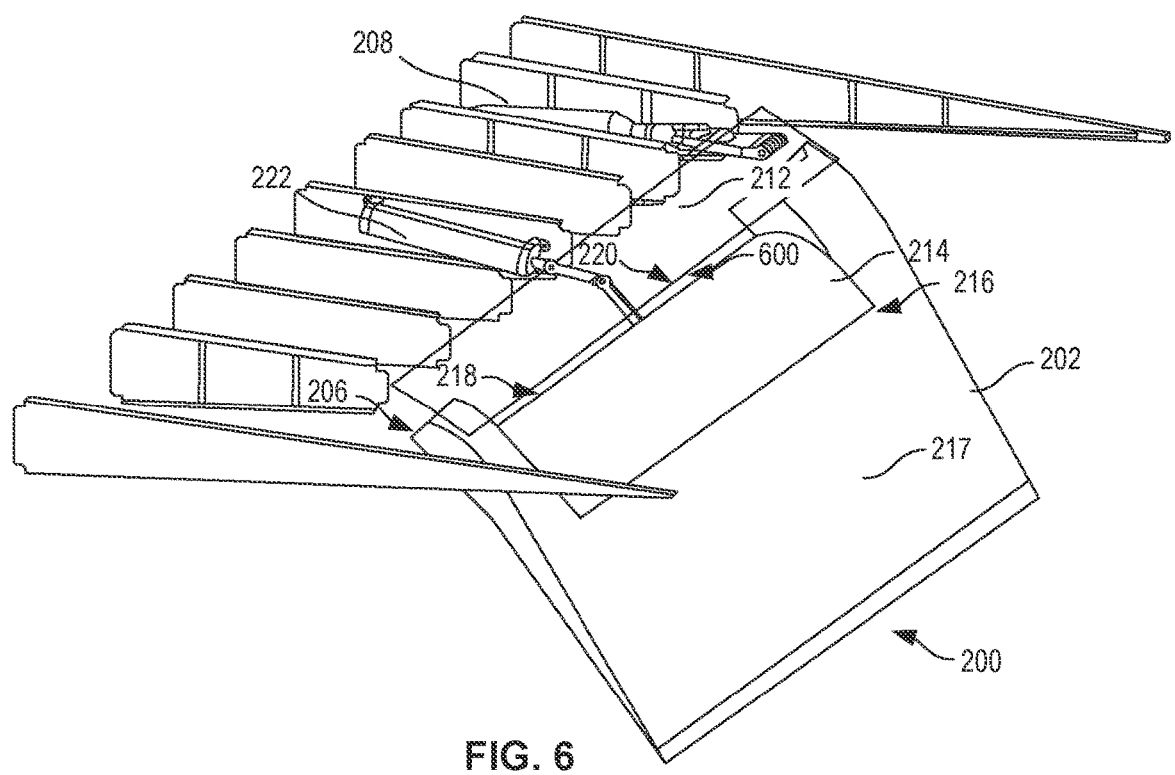

FIG. 6 illustrates the flaperon 202 in the third or downward deflected position of FIG. 5 due to actuation by the first actuator 208. Also, in FIG. 6, the bullnose 214 of the control surface assembly 200 is moved from the extended or stowed position of FIGS. 3-5 to the retracted position via the second actuator 222. As disclosed herein, the second actuator 222 causes the bullnose 214 to move to the retracted position in response to instructions from the bullnose actuator control circuitry 224 of the flight control system circuitry 210 (FIG. 2). The second actuator 222 causes the bullnose 214 to move relative to the surface 217 of the flaperon 202. In particular, the second actuator 222 causes the second end 218 of the bullnose 214 to move away (e.g., retract) from the second end or leading edge 206 of the flaperon 202, which causes the first end 216 of the bullnose 214 to move toward the first end or trailing edge 204 of the flaperon 202.

As a result of retraction of the bullnose 214, the bullnose 214 is no longer covered by the shroud 212. As illustrated in FIG. 6, an opening, gap, or slot 600 is formed between the second end 218 of the bullnose 214, the end 220 of the shroud 212, and the second end 206 of the flaperon 202. Therefore, retraction of the bullnose 214 creates a gap between the flaperon 202 and the wing. When the bullnose 214 is retracted as shown in FIG. 6, high pressure air flows from below the wing flows upward through the slot 600 and energizes airflow over the flaperon 202 and/or the wing (e.g., the boundary layer). As a result, lift is increased.

Figure 7:
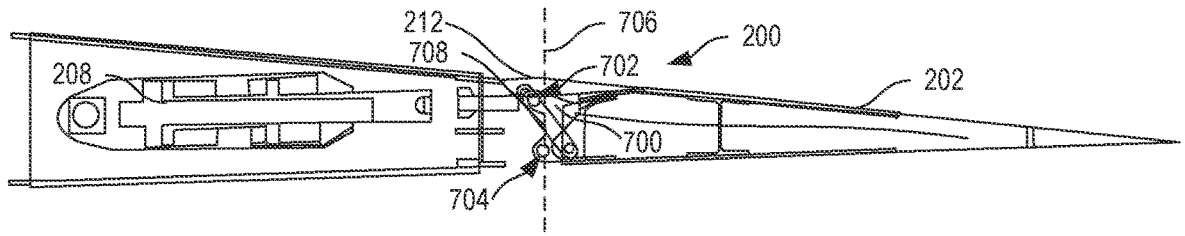
FIGS. 7 and 8 are cross-sectional views of a first portion of the example control surface assembly of FIG. 2.

FIG. 7 is a cross-sectional view of a first portion of the control surface assembly 200 of FIG. 2 including the primary actuator 208, a portion of the flaperon 202 coupled to the primary actuator 208, and a portion of the shroud 212. As shown in FIG. 7, the flaperon 202 is in the first or neutral position (e.g., corresponding to the position of the flaperon 202 shown in FIG. 3). The flaperon 202 includes a hinge assembly 700. The hinge assembly 700 can be supported by, for instance, one or more spars (not shown) of the wing, skin (not shown) of the wing (e.g., a skin of the lower surface 105 of the wing 104), etc. In the example of FIG. 7, the first actuator 208 is coupled to the flaperon 202 at a first joint 702 of the hinge assembly 700. During movement of the flaperon 202, the flaperon 202 pivots about a second joint 704 of the hinge assembly 700. A dashed line 706 in FIG. 7 represents the hinge line about which the flaperon 202 rotates. In the example of FIG. 7, a first coupler or link 708 couples the shroud 212 and the flaperon 202 to enable the shroud 212 to move with the flaperon 202 during rotation of the flaperon 202.

Figure 8:
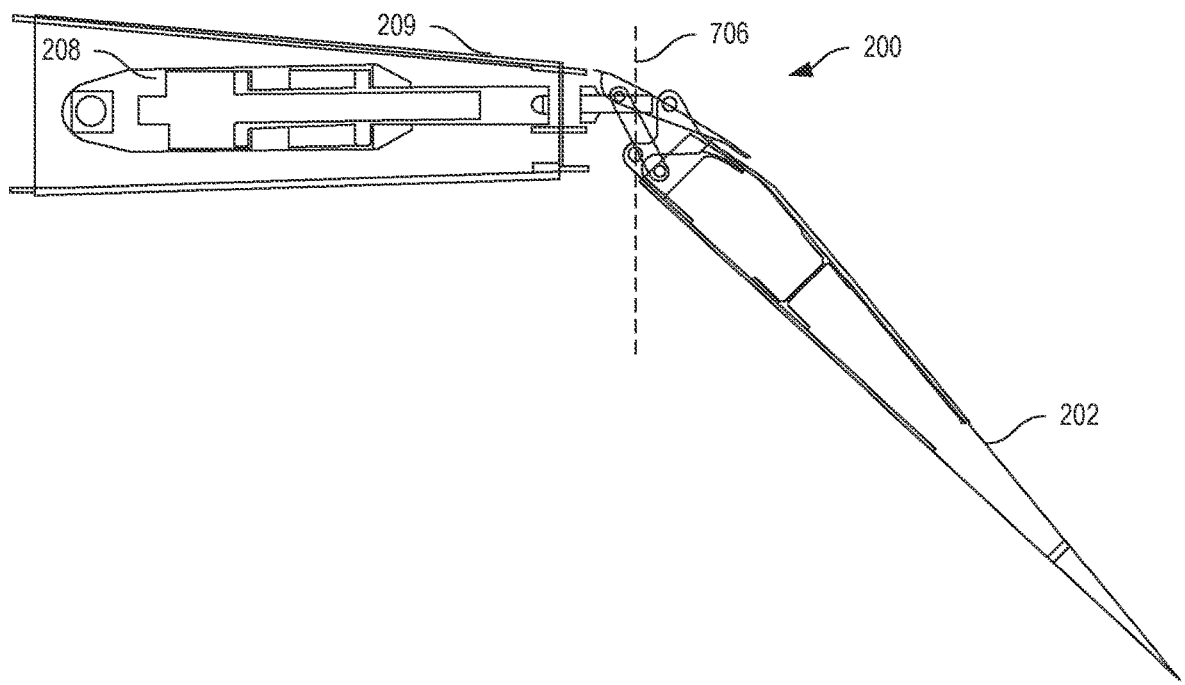

FIG. 8 illustrates the flaperon 202 in the downward deflected position (e.g., corresponding to the position of the flaperon 202 shown in FIG. 5) as a result of actuation via the primary actuator 208. As shown in FIG. 8, the flaperon 202 pivots about the hinge line 706 to deflect downward relative to the neutral position shown in FIG. 7. As shown in FIG. 8, the hinge assembly 700 remains behind a trailing edge of the wing (where the wing is represented by the rib 209 in FIG. 8) rather than being disposed below or underneath the wing.

Figure 9:
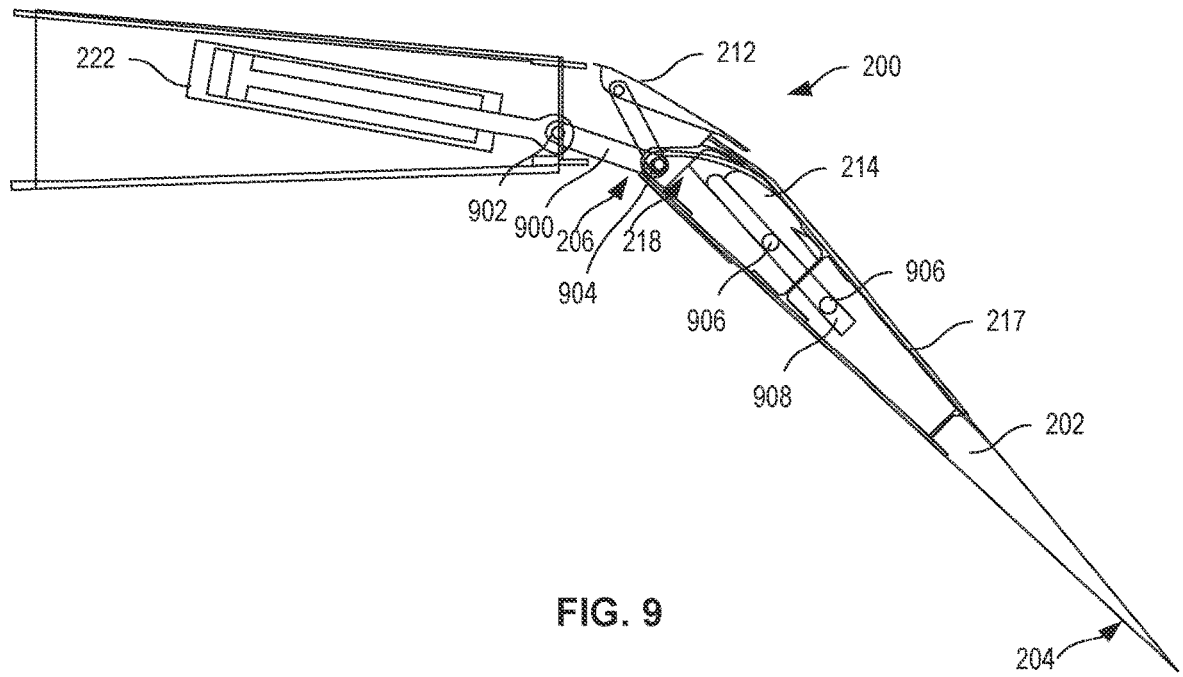
FIGS. 9-13 are cross-sectional views of a second portion of the example control surface assembly of FIG. 2.

FIG. 9 is a cross-sectional view of a second portion of the control surface assembly 200 of FIG. 2 including the second actuator 222, a portion of the flaperon 202 coupled to the second actuator 222, the bullnose 214, and a portion of the shroud 212. In the example of FIG. 9, the flaperon 202 is in the downward deflected position shown in FIG. 8. Also, the bullnose 214 is in the stowed or extended position (e.g., corresponding to the position of the bullnose 214 shown in FIG. 5).

As shown in FIG. 9, a second coupler or link 900 extends between the second actuator 222 and the bullnose 214 to operatively couple the second actuator 222 and the bullnose 214. A first endpoint 902 of the second coupler 900 is coupled to the second actuator 222 (e.g., via a pin joint). A second endpoint 904 of the second coupler 900 is coupled to the bullnose 214 proximate to the second end 218 of the bullnose 214. The second actuator 222 causes the bullnose 214 to move from the extended position of FIG. 9 to the retracted position via the coupler 900. For instance, the second actuator 222 drives the second coupler 900 to move (e.g., push) the bullnose 214 away from the second end or leading edge 206 of the flaperon 202 toward the first end or trailing edge 204 of the flaperon 202. The example bullnose 214 of FIG. 9 includes one or more rollers 906 that are received in corresponding track(s) 908 carried by the surface 217 of the flaperon 202. Thus, in some examples, the bullnose 214 slides or rolls relative to the surface 217 of the flaperon 202 in response to actuation of the second coupler 900 by the second actuator 222. Other means for translating the bullnose 214 relative to the surface 217 of the flaperon 202 could be used.

Figure 10:
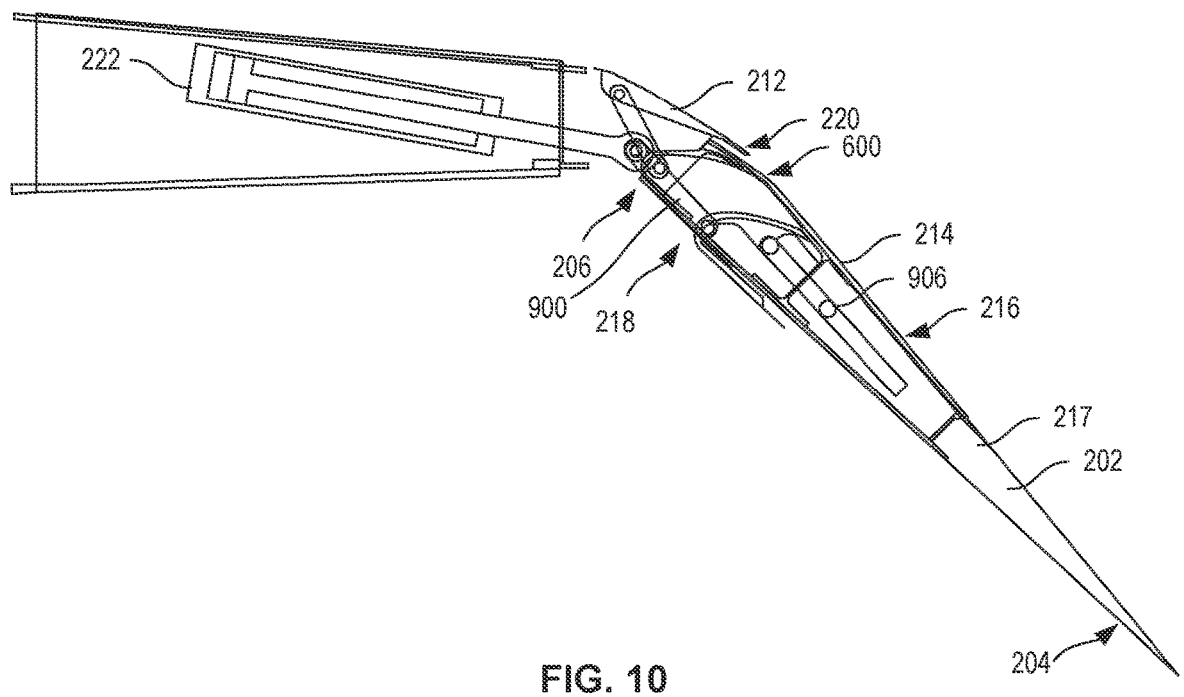

FIG. 10 illustrates the example bullnose 214 in the retracted position (e.g., corresponding to the position of the bullnose 214 shown in FIG. 6) as result of actuation of the second coupler 900 by the second actuator 222. As shown in FIG. 10, the bullnose 214 is translated relative to the surface 217 of the flaperon 202 such that the second end 218 of the bullnose 214 moves away (e.g., retracts) from the leading edge 206 of the flaperon 202. Put another way, the first end 216 of the bullnose 214 is pushed toward the first end or trailing edge 204 of the flaperon 202 via the second actuator 222 and the second coupler 900. In the example of FIG. 10, the bullnose 214 moves along the surface 217 of the flaperon 202 via the roller(s) 906. As a result of translation of the bullnose 214, the opening or gap 600 is formed between the end 220 of the shroud 212, the second end 218 of the bullnose 214, and the second end 206 of the flaperon 202.

The movement of the bullnose 214 away from the leading edge 204 of the flaperon 202 changes the chord length measurement with respect to the bullnose 214 and flaperon 202. When the bullnose 214 is in the extended position as shown in of FIG. 9, the chord length is measured from the second end or leading edge 218 of the bullnose 214 to the trailing edge 204 of the flaperon 202. When the bullnose 214 is in the retracted position as shown in FIG. 10, the bullnose 214 moves aftward and, thus, the second end or leading edge 218 of the bullnose 214 is now closer to the trailing edge 204 of the flaperon 202. As a result, retraction of the bullnose 214 results in a shorter effective chord length. The reduction in chord length facilitates creation of the opening 600 for air to pass through and energize the air flowing over the upper surface of the wing and/or the surface 217 of the flaperon 202.

Figure 11:
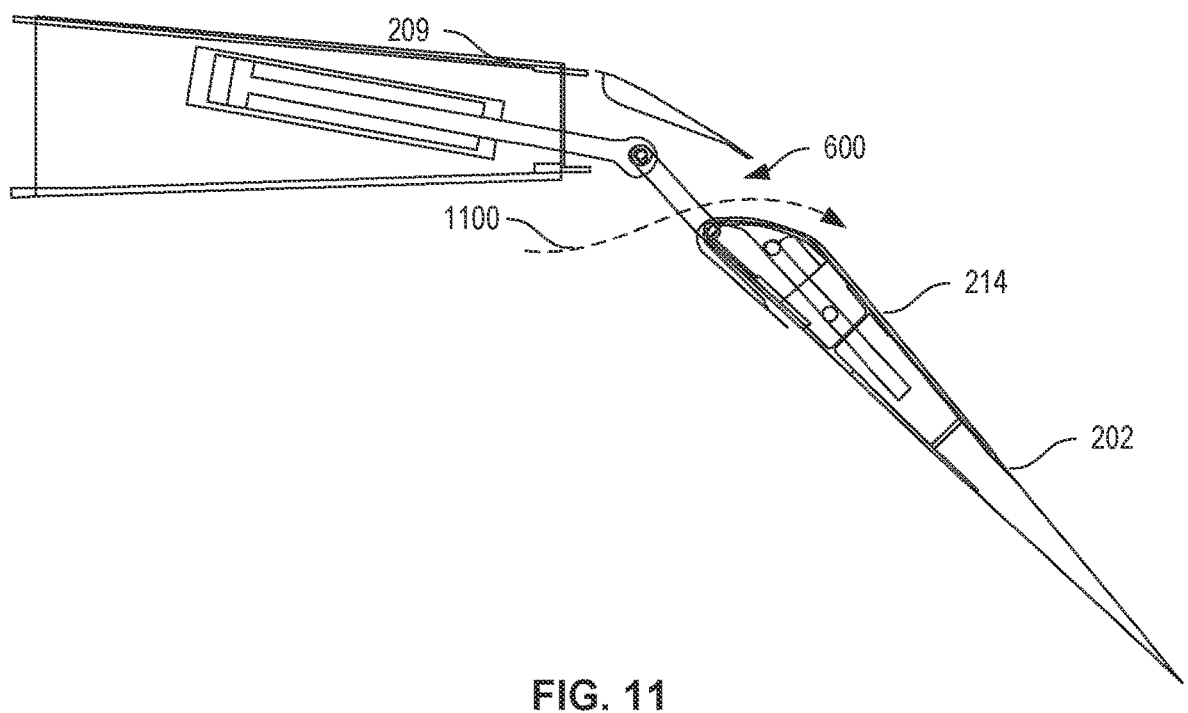

FIG. 11 illustrates the example bullnose 214 in the retracted position of FIG. 10. For illustrative purposes, a portion of the flaperon 202 is not shown in FIG. 11 to further show the opening 600 formed as a result of retraction of the bullnose 214 relative to the leading edge 206 (FIG. 10) of the flaperon 202. As represented by the arrow 1100 in FIG. 11, air flows from beneath the wing (e.g., the wing 104 of FIG. 1 including the rib 209) through the opening 600. Contrary to known slotted flaps, the opening 600 created via retraction of the bullnose 214 provides for increased airflow and lift without introducing drag due to the presence of hinge(s) and/or fairing(s) disposed beneath the wing. As disclosed in connection with FIG. 8, the hinge assembly 700 of the flaperon 202 remains behind the trailing edge of the wing during rotation of the flaperon 202.

Figure 12:
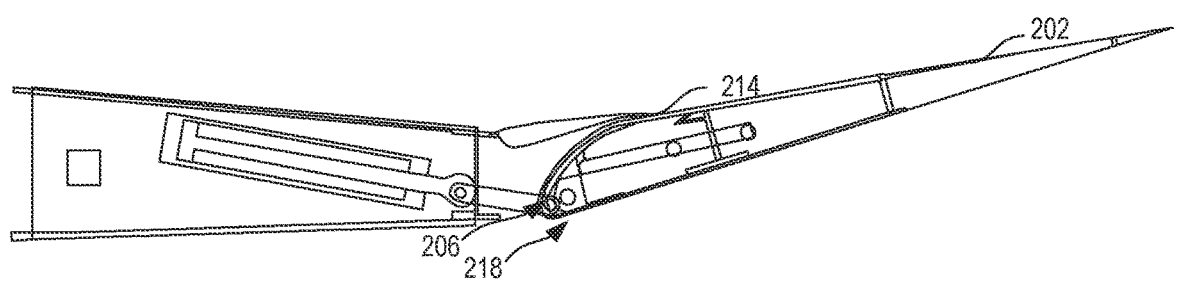
Figure 13:
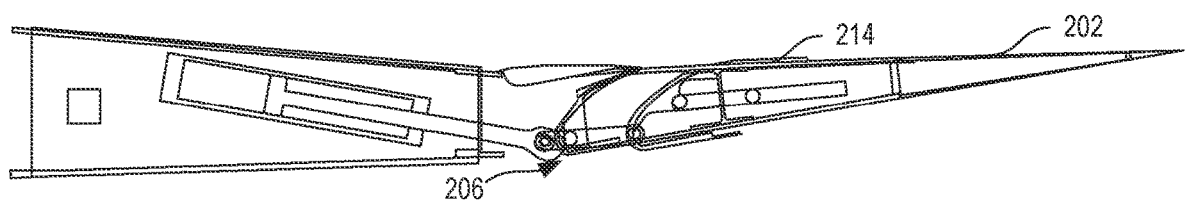

As disclosed herein, movement of the bullnose 214 via the second actuator 222 is independent of movement of the flaperon 202 via the first actuator 208. FIGS. 12 and 13 further illustrate the independent movement of the flaperon and the bullnose 214.

FIG. 12 illustrates rotation of the flaperon 202 to an upward deflected position (corresponding to the position of the flaperon 202 shown in FIG. 4) from the downward deflected position of FIG. 10. The flaperon 202 moves to the upward deflected position as a result of actuation by the primary actuator 208 (not shown in FIG. 12). In the example of FIG. 12, the bullnose 214 is in the stowed position (i.e., proximate to the leading edge 206 of the flaperon 202). The bullnose 214 remains in the stowed position during movement of the flaperon 202 as illustrated in FIG. 12.

FIG. 13 also illustrates movement of the flaperon 202 to the upward deflected position from the downward deflected position via the first actuator 208 (not shown in FIG. 13). However, in contrast to FIG. 12, the bullnose 214 is in the retracted position during movement of the flaperon 202 to the upward deflected position. For instance, the bullnose 214 was retracted (i.e., translated away from the leading edge 206 of the flaperon 202) when the flaperon 202 was in the downward deflected position as disclosed in connection with FIG. 10. The bullnose 214 remains in the retracted position when the flaperon 202 moves to the upward deflected position as illustrated in FIG. 13.

Figure 14A:
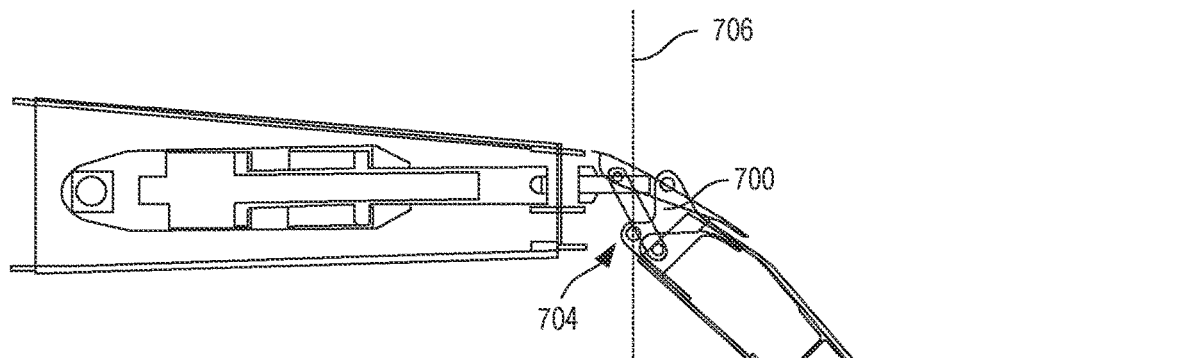
FIGS. 14A-C illustrate positions of a coupler of the example control surface assembly of FIG. 2 relative to a hinge line of a control surface of the example control surface assembly.
Figure 14B:
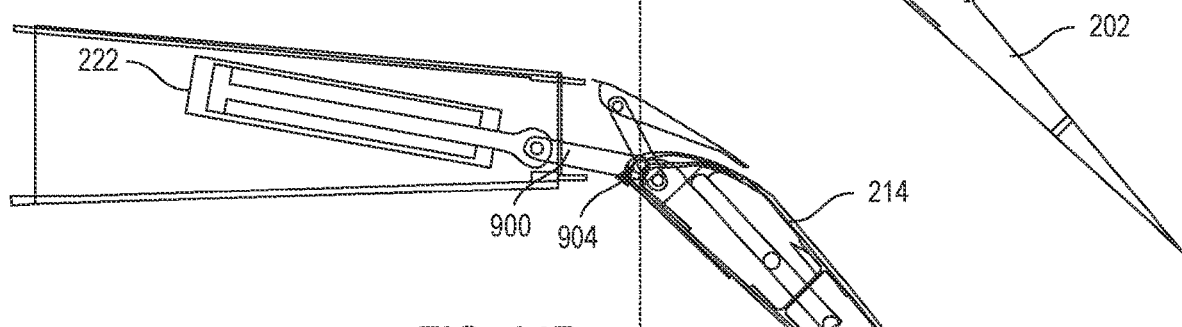
Figure 14C:
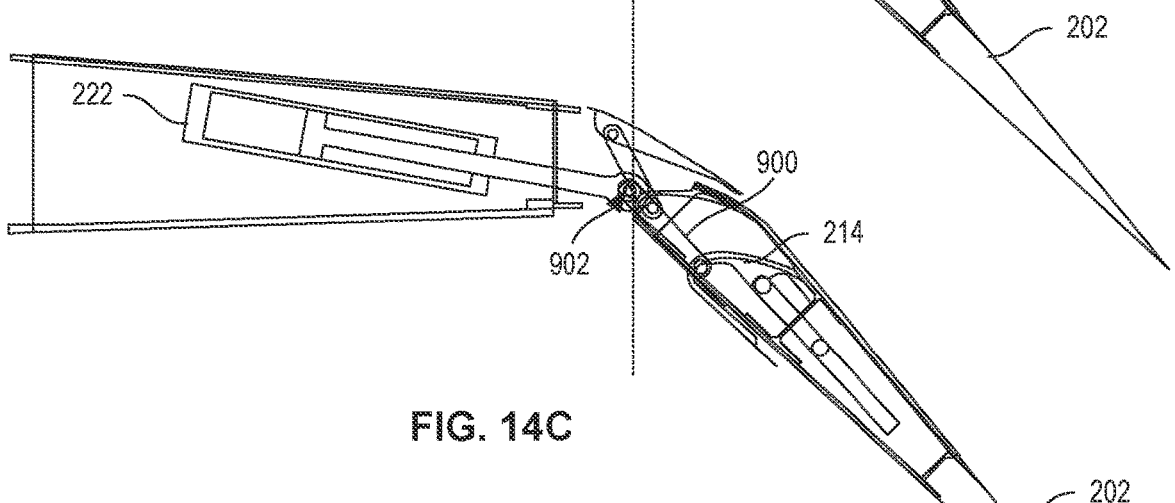

FIGS. 14A-C illustrate the relationship between the hinge line 706 of the flaperon 202 and the second coupler 900 that operatively couples the second actuator 222 to the bullnose 214. As illustrated in FIGS. 14A and 14B, when the bullnose 214 is in the extended or stowed position of FIG. 14B, the second endpoint 904 of the second coupler 900 is coincident with the hinge line 706 of the flaperon 202 extending through the second joint 704 of the hinge assembly 700. As illustrated in FIGS. 14A and 14C, when the bullnose 214 is in the retracted position (i.e., a fully retracted position) of FIG. 14C, the first endpoint 902 of the second coupler 900 is coincident with the hinge line 706 of the flaperon 202 extending through the second joint 704 of the hinge assembly 700. The coincident arrangement of the endpoints 902, 904 of the second coupler 900 with the hinge line 706 of the flaperon 202 enables the bullnose 214 to maintain the stowed position or the retracted position independent of movement of the flaperon 202. In other words, the coincident arrangement of the endpoints 902, 904 of the second coupler 900 with the hinge line 706 of the flaperon 202 prevents or substantially prevents movement of the bullnose 214 relative to the flaperon 202 when the flaperon 202 is rotated.

The second actuator 222 can cause the bullnose 214 to move from the retracted position to the extended or stowed position based on, for example, instructions from the bullnose actuator control circuitry 224 indicating that the opening 600 should be closed. In such examples, the second actuator 222 can cause the second coupler 900 to pull the bullnose 214 toward the leading edge 206 of the flaperon 202. The bullnose 214 moves relative to the surface 217 of the flaperon 202 (e.g., via the roller(s) 906) to return to the extended position.

Figure 15:
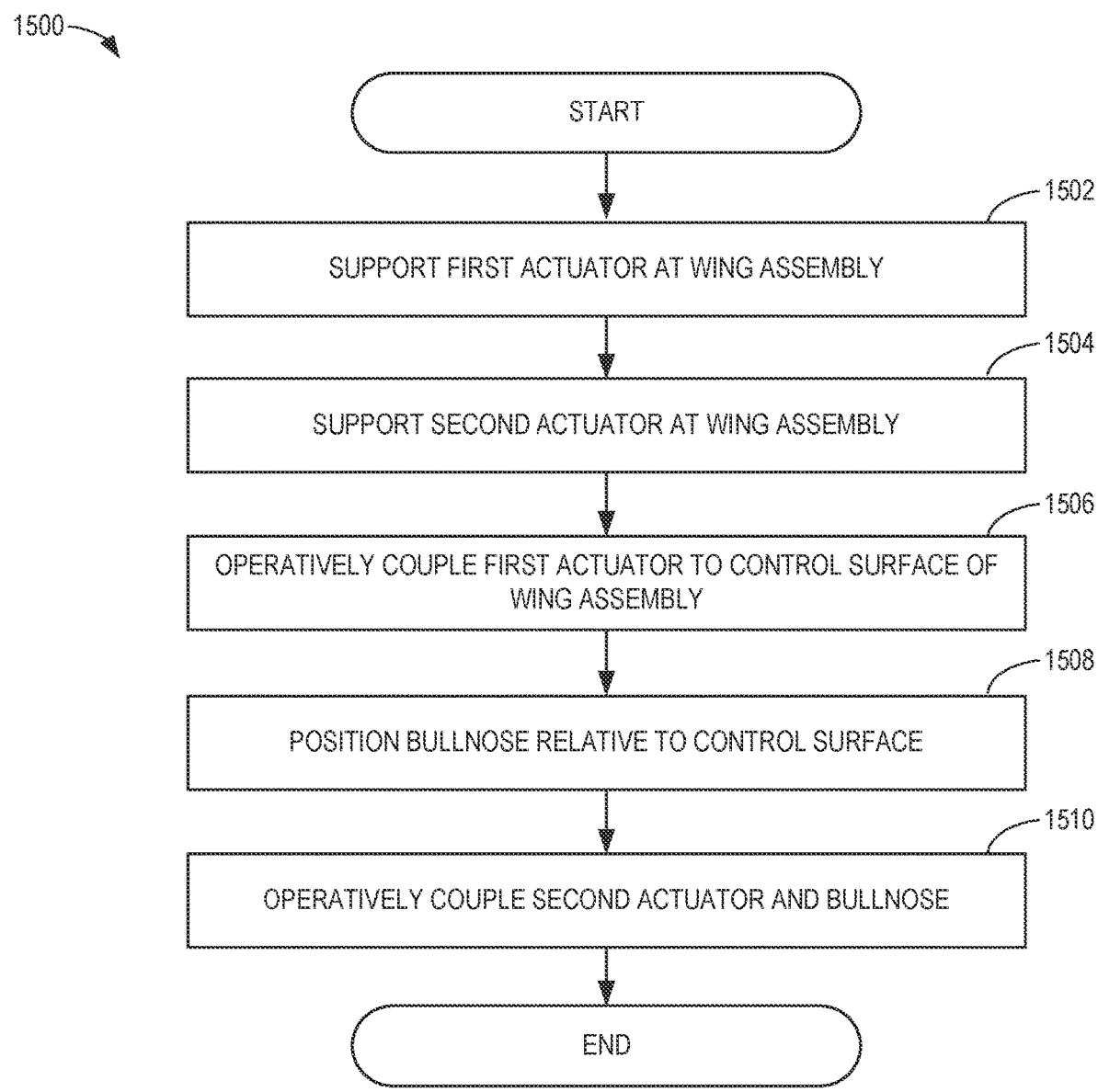
FIG. 15 is a flowchart of an example method to assemble the example control surface assembly of FIGS. 2-14 in accordance with teachings of this disclosure.

FIG. 15 is a flowchart of example method 1500 to assemble a control surface assembly including a control surface actuator and a bullnose actuator in accordance with teachings of this disclosure. The example method 1500 includes supporting a first actuator at a wing assembly at block 1502. For example, the first actuator 208 can be pivotably mounted between ribs 209 of the wing 104 of the aircraft 100 of FIG. 1. The example method 1500 includes supporting a second actuator at the wing assembly at block 1504. For example, the second actuator 222 can be coupled (e.g., fixedly coupled) to one of the ribs 209 of the wing 104.

The example method 1500 includes operatively coupling the first actuator to a control surface of the wing assembly at block 1506. For example, the first actuator 208 can be operatively coupled to the flaperon 202 via the hinge assembly 700 of the flaperon 202 to enable the first actuator 208 to control rotation of the flaperon 202.

The example method 1500 includes positioning a bullnose relative to the control surface at block 1508. For example, the bullnose 214 can be positioned relative to the flaperon 202 by aligning the roller(s) 906 of the bullnose 214 with the track(s) 908 on the surface 217 of the flaperon 202.

The example method 1500 includes operatively coupling the second actuator to the bullnose at block 1510. For example, the second actuator 222 can be operatively coupled to the bullnose 214 via the second coupler 900. The second coupler 900 can be selected and coupled to the bullnose 214 such that (a) the second endpoint 904 of the second coupler 900 is coincident with the hinge line 706 extending through the hinge joint 704 of the flaperon hinge assembly 700 when the bullnose 214 is in the extended position and (b) the first endpoint 902 of the second coupler 900 is coincident with the hinge line 706 of the flaperon 202 when the bullnose 214 is in the retracted position (i.e., a fully retracted position). As disclosed in connection with FIGS. 14A-C, the coincident arrangement between the endpoints 902, 904 of the second coupler 900 and the hinge line 706 prevents movement of the bullnose during rotation of the control surface (e.g., the flaperon 202).

Although the example method 1500 is described with reference to the flowchart illustrated in FIG. 15, many other methods of assembling a control surface assembly including a control surface actuator and a bullnose actuator may alternatively be used. For example, the order of execution of the blocks may be changed, and/or some of the blocks described may be changed, eliminated, or combined. Similarly, additional operations may be included in the example method of FIG. 15 before, in between, or after the blocks shown in FIG. 15.

Figure 16:
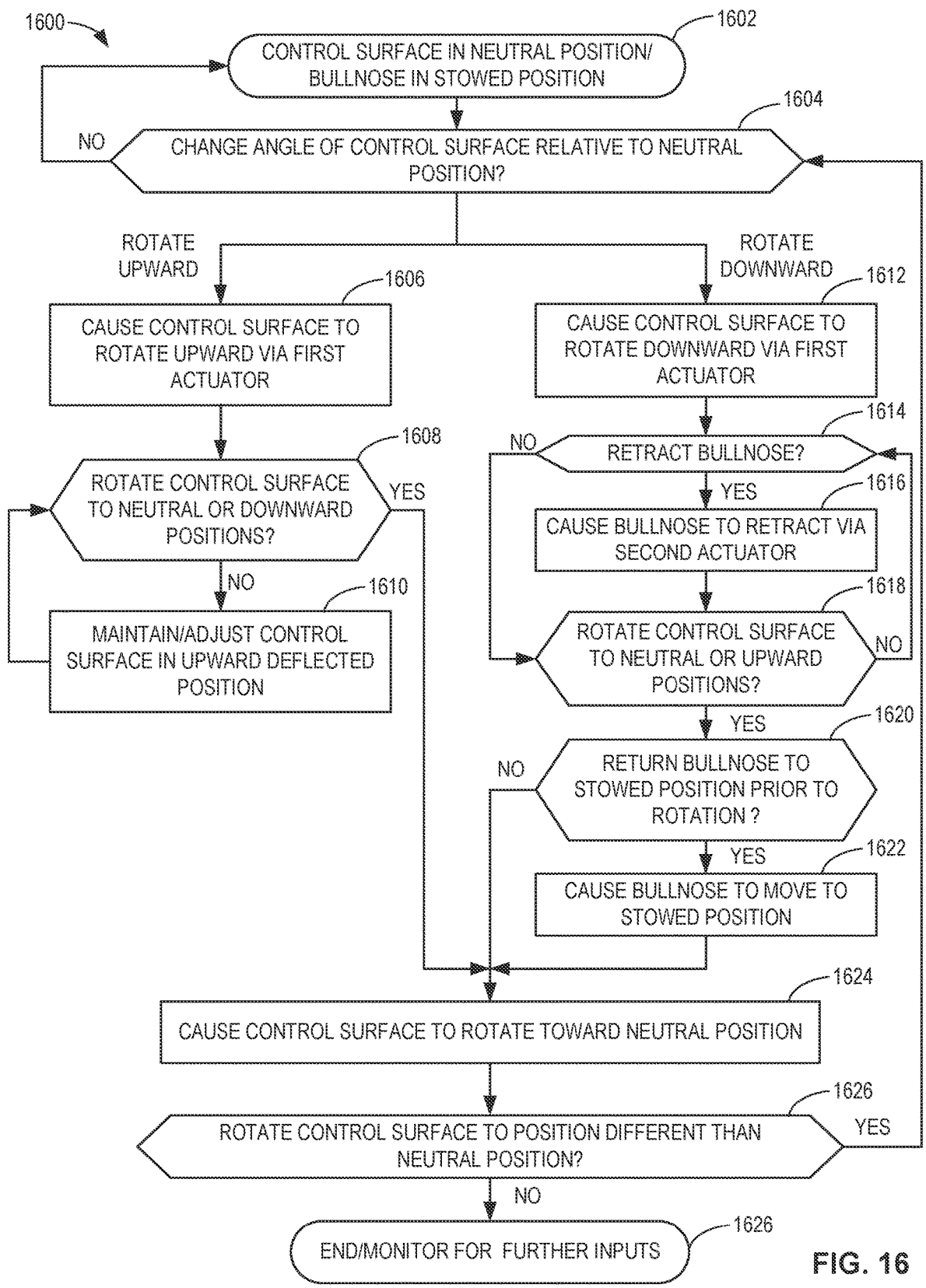
FIG. 16 a flowchart representative of example machine readable instructions and/or example operations that may be executed by example processor circuitry to implement the flight control system circuitry of FIG. 2 to control one or more actuators of the example control surface assembly of FIGS. 2-14.

FIG. 16 is a flowchart representative of example machine readable instructions and/or example operations 1600 that may be executed and/or instantiated by processor circuitry to control a control surface (e.g., the flaperon 202) and the bullnose 214 of the example control surface assembly 200 of FIG. 2. The machine readable instructions and/or the operations 1600 of FIG. 16 begin at block 1602, at which the flaperon 202 is in the neutral position relative to the wing surface (i.e., neither deflected upward nor downward as shown in FIGS. 3 and 7). Also, the bullnose 214 is in the stowed position.

At block 1604, the flaperon actuator control circuitry 211 of the flight control system circuitry 210 of FIG. 2 determines if the angle of the flaperon 202 should be changed relative to the neutral position. For example, flaperon actuator control circuitry 211 can received user input(s) indicating that the angle of the flaperon should be adjusted.

If the flaperon actuator control circuitry 211 determines, based on the user input(s), that the flaperon 202 should be rotated upward, then at block 1606, the flaperon actuator control circuitry 211 causes the flaperon 202 to rotate upward (e.g., away from the ground surface) via the first actuator 208. For example, the flaperon actuator control circuitry 211 can output instructions to cause the first actuator 208 to deflect the flaperon 202 upward as shown in FIGS. 4, 12, and 13.

The flaperon actuator control circuitry 211 maintains or adjusts the flaperon 202 in the upward deflected position until a decision is made to return the flaperon 202 to the neutral position or rotate the flaperon 202 to the downward deflected position at blocks 1608, 1610.

If the flaperon actuator control circuitry 211 determines that the flaperon 202 should be rotated upward, then at block 1606, the flaperon actuator control circuitry 211 instructs the first actuator to cause the flaperon 202 to rotate downward relative to the neutral position at block 1612.

At block 1614, the bullnose actuator control circuitry 224 of the flight control system circuitry 210 determines whether the bullnose 214 should be retracted. For example, the bullnose actuator control circuitry 224 can receive user inputs requesting that the bullnose 214 is retracted to increase lift of the aircraft.

If the bullnose actuator control circuitry 224 determines that the bullnose 214 is to be retracted, then at block 1616 the bullnose actuator control circuitry 224 instructs the second actuator 222 to cause the bullnose 214 to move aftward (i.e., by driving the second coupler 900 to cause the bullnose to move away from the second end or leading edge 206 of the flaperon 202 and toward the first end or trailing edge 204 of the flaperon 202).

At block 1618, the flaperon actuator control circuitry 211 determines if the flaperon 202 should return to the neutral position or rotate to the upward deflected position (e.g., based on user inputs).

In some examples, at block 1620, the bullnose actuator control circuitry 224 determines if an input has been received indicating that the bullnose 214 should return to the stowed position prior to rotation of the flaperon 202 from the downward deflected position. If the bullnose 214 is to return to the stowed position, then at block 1622, the bullnose actuator control circuitry 224 instructs the second actuator 222 to cause the second coupler 900 to pull the bullnose 214 toward the leading edge 206 of the flaperon 202. In other examples, the bullnose 214 remains in the retracted position when the flaperon 202 is moved from the downward deflected position toward the neutral position.

At block 1624, the flaperon actuator control circuitry 211 causes the flaperon 202 to move either from the upward deflected position (block 1608) or the downward deflected position (block 1620) toward the neutral position. At block 1626, the flaperon actuator control circuitry 211 determines if the flaperon 202 should be moved to a position different than the neutral position (e.g., from the upward deflected position to the downward deflected position). If the flaperon 202 is to be rotated to a position different than the neutral position, then control returns to block 1604 to cause translation of the flaperon 202. The example instructions 1600 end at block 1626 with continued monitoring for inputs to control the flaperon 202 and/or the bullnose 214.

While an example manner of implementing the flight control system circuitry 210 is illustrated in FIG. 2, one or more of the elements, processes, and/or devices illustrated in FIG. 2 may be combined, divided, re-arranged, omitted, eliminated, and/or implemented in any other way. Further, the example flaperon actuator control circuitry 211, the example bullnose actuator control circuitry 224, and/or, more generally, the example flight control system circuitry 210 of FIG. 2, may be implemented by hardware alone or by hardware in combination with software and/or firmware. Thus, for example, any of the example the example bullnose actuator control circuitry 224, and/or, more generally, the example flight control system circuitry 210, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example flight control system circuitry 210 of FIG. 2 may include one or more elements, processes, and/or devices in addition to, or instead of, those illustrated in FIG. 2, and/or may include more than one of any or all of the illustrated elements, processes, and devices.

FIG. 16 is a flowchart representative of example hardware logic circuitry, machine readable instructions, hardware implemented state machines, and/or any combination thereof for implementing the flight control system circuitry 210 of FIG. 2. The machine readable instructions may be one or more executable programs or portion(s) of an executable program for execution by processor circuitry, such as the processor circuitry 1712 shown in the example processor platform 1700 discussed below in connection with FIG. 17. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 16, many other methods of implementing the example flight control system circuitry 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 16 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 17:
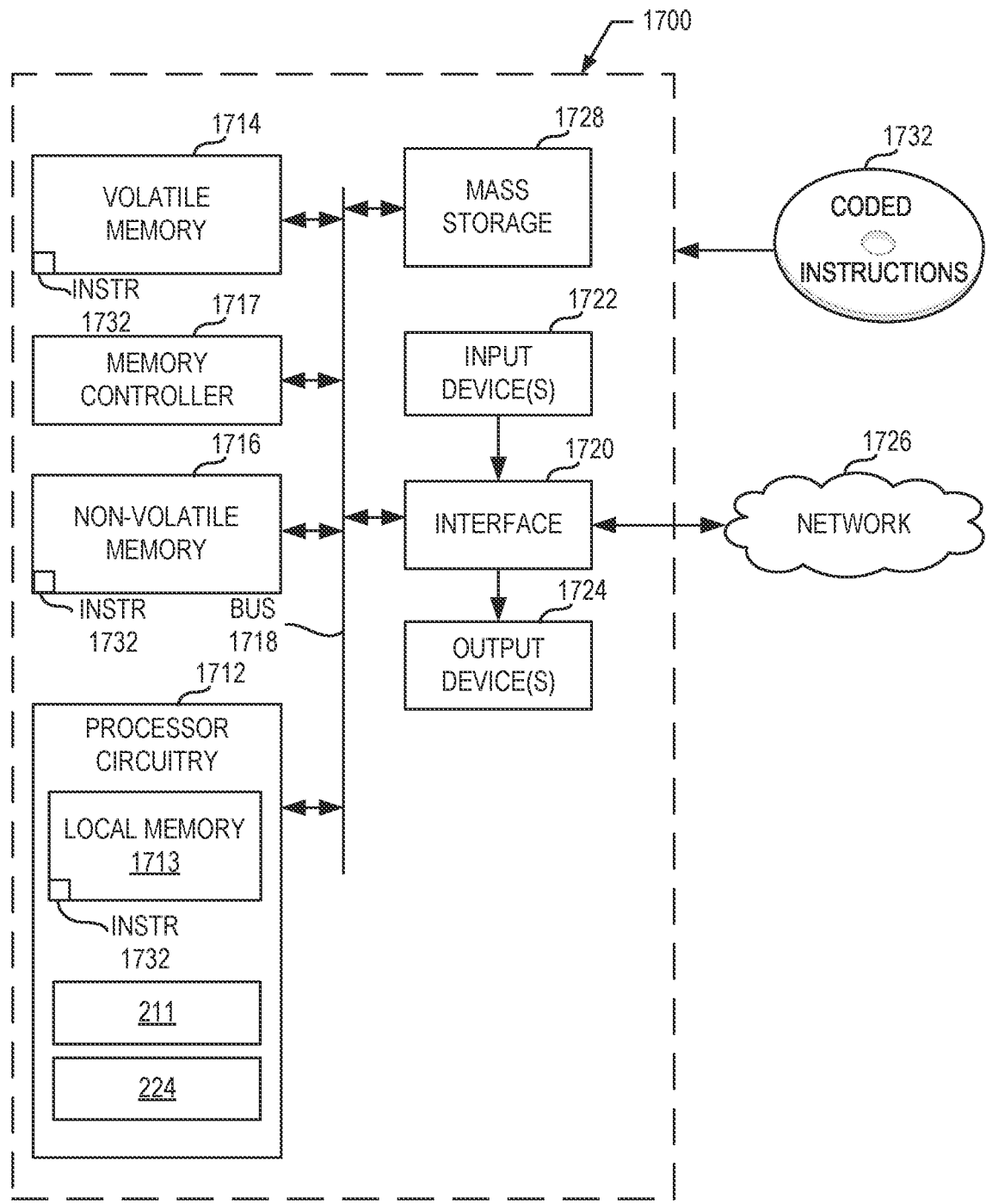
FIG. 17 is a block diagram of an example processing platform including processor circuitry structured to execute the example machine readable instructions and/or the example operations of FIG. 16 to implement the flight control system circuitry of FIG. 2.

FIG. 17 is a block diagram of an example processor platform 1700 structured to execute and/or instantiate the machine readable instructions and/or the operations of FIG. 16 to implement the flight control system circuitry 210 of FIG. 2. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs, microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the example flaperon actuator control circuitry 211 and the example bullnose actuator control circuitry 224.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1732, which may be implemented by the machine readable instructions of FIG. 16, may be stored in the mass storage device 1728, in the volatile memory 1714, in the non-volatile memory 1716, and/or on a removable non-transitory computer readable storage medium such as a CD or DVD.

From the foregoing, it will be appreciated that example systems, methods, apparatus, and articles of manufacture have been disclosed that provide for selective, independent control of a control surface (e.g., a flap, a flaperon) and a bullnose associated with the control surface via actuators supported by a wing including the control surface. Examples disclosed herein reduce structural complexities of the control surface by supporting the actuators at the wing rather than within the control surface. Examples disclosed herein include a first actuator to control rotation of the control surface and a second actuator to drive a coupler or link to move the bullnose independent of the control surface rotation. As a result of movement of the bullnose relative the control surface, an opening is formed to enable air to flow from underneath the wing through the opening to energize airflow over the upper surface of the wing. As a result, examples control surface assemblies disclosed herein provide for increased lift performance.

Example assemblies for air vehicle control surfaces and related methods are disclosed herein. Further examples and combinations thereof include the following:

Example 1 includes apparatus including a control surface; a bullnose carried by the control surface, the bullnose moveable relative to the control surface; a first actuator operatively coupled to the control surface to cause the control surface to rotate; and a second actuator operatively coupled to the control surface, the second actuator to cause the bullnose to move from a first position to a second position to cause an opening to be formed relative to the control surface, the movement of the bullnose independent of rotation of the control surface.

Example 2 includes the apparatus of example 1, further including a coupler extending between the second actuator and the bullnose.

Example 3 includes the apparatus of examples 1 or 2, wherein a hinge line of the control surface and a first endpoint of the coupler are coincident when the bullnose is in the first position.

Example 4 includes the apparatus of any of examples 1-3, wherein the hinge line of the control surface and a second endpoint of the coupler are coincident when the bullnose is in the second position, the second endpoint opposite the first endpoint.

Example 5 includes the apparatus of any of examples 1-4, wherein the bullnose includes one or more rollers and the control surface includes one or more tracks to receive the one or more rollers.

Example 6 includes the apparatus of any of examples 1-5, further including a shroud, at least a portion of the bullnose covered by the shroud when the bullnose is in the first position, the bullnose uncovered when the bullnose is in the second position.

Example 7 includes the apparatus of any of examples 1-6, wherein the opening is defined between a leading edge of the control surface, the shroud, and the bullnose.

Example 8 includes the apparatus of any of examples 1-7, wherein the second actuator is spaced apart from the bullnose and the control surface.

Example 9 includes the apparatus of any of examples 1-8, wherein the second actuator includes a linear actuator.

Example 10 includes an aircraft including a wing; a flaperon moveably coupled to a trailing edge of the wing; a bullnose supported by the flaperon; a first actuator operatively coupled to the flaperon to cause the flaperon to move between an upward deflected position and a downward deflected position relative to the wing; and a second actuator operatively coupled to the bullnose to cause the bullnose to move relative to the flaperon from a stowed position to a retracted position to cause an opening to be defined between the flaperon and the wing, the first actuator and the second actuator carried by the wing.

Example 11 includes the aircraft of example 10, further including a coupler extending between the second actuator and the bullnose.

Example 12 includes the aircraft of examples 10 or 11, wherein the second actuator is fixedly coupled to a rib of the wing.

Example 13 includes the aircraft of any of examples 10-12, further including a hinge assembly, the flaperon to move via the hinge assembly, the hinge assembly disposed behind the trailing edge of the wing.

Example 14 includes the aircraft of any of examples 10-13, wherein the second actuator is to cause the bullnose to move to the retracted position by moving the bullnose toward a trailing edge of the flaperon when the flaperon is in the downward deflected position.

Example 15 includes the aircraft of any of examples 10-14, wherein the first actuator is to cause the flaperon to move to the upward deflected position, the bullnose in the retracted position when the flaperon is in the upward deflected position.

Example 16 includes the aircraft of any of examples 10-15, further including a shroud, the shroud to cover at least a portion of the bullnose when the bullnose is in the stowed position.

Example 17 includes a system including a control surface; a bullnose moveable relative to the control surface; a first actuator operatively coupled to the control surface; a second actuator operatively coupled to the bullnose; memory; machine-readable instructions; and processor circuitry to execute the machine-readable instructions to cause the first actuator to rotate the control surface between a neutral position and a downward deflected position relative to the neutral position; and cause the second actuator to move the bullnose from an extended position to a retracted position to create an opening relative to the control surface when the control surface is in the downward deflected position.

Example 18 includes the system of example 17, wherein the processor circuitry is to cause the first actuator to rotate the control surface from the downward deflected position to the neutral position, the bullnose in the retracted position during the rotation of the control surface.

Example 19 includes the system of examples 17 or 18, wherein the processor circuitry is to cause the first actuator to rotate the control surface from the neutral position to an upward deflected position relative to the neutral position, the bullnose in the retracted position when the control surface is in the upward deflected position.

Example 20 includes the system of any of examples 17-19, wherein the control surface includes one of a flap or a flaperon, the bullnose proximate to a leading edge of the flap or the flaperon when the bullnose is in the extended position.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
a control surface having one or more tracks;
a bullnose carried by the control surface, the bullnose moveable relative to the control surface, the bullnose including one or more rollers, the one or more tracks to receive the one or more rollers;
a first actuator operatively coupled to the control surface to cause the control surface to rotate; and
a second actuator operatively coupled to the control surface, the second actuator to cause the bullnose to move from a first position to a second position to cause an opening to be formed relative to the control surface, the movement of the bullnose independent of rotation of the control surface.

2. An apparatus comprising:
a control surface;
a bullnose carried by the control surface, the bullnose moveable relative to the control surface;
a first actuator operatively coupled to the control surface to cause the control surface to rotate;
a second actuator operatively coupled to the control surface, the second actuator to cause the bullnose to move from a first position to a second position to cause an opening to be formed relative to the control surface, the movement of the bullnose independent of rotation of the control surface; and
a coupler extending between the second actuator and the bullnose, wherein a hinge line of the control surface and a first endpoint of the coupler are coincident when the bullnose is in the first position.

3. The apparatus of claim 2, wherein the hinge line of the control surface and a second endpoint of the coupler are coincident when the bullnose is in the second position, the second endpoint opposite the first endpoint.

4. The apparatus of claim 1, further including a coupler extending between the second actuator and the bullnose.

5. The apparatus of claim 1, further including a shroud, at least a portion of the bullnose covered by the shroud when the bullnose is in the first position, the bullnose uncovered when the bullnose is in the second position.

6. The apparatus of claim 5, wherein the opening is defined between a portion of the control surface, a portion of the shroud, and a portion of the bullnose.

7. The apparatus of claim 2, wherein the second actuator includes a linear actuator.

8. An aircraft comprising:
a wing;
a flaperon moveably coupled to a trailing edge of the wing;
a track carried by a surface of the flaperon;
a bullnose supported by the flaperon, a portion of the bullnose slidably received in the track;
a first actuator operatively coupled to the flaperon to cause the flaperon to move between an upward deflected position and a downward deflected position relative to the wing; and
a second actuator operatively coupled to the bullnose to cause the bullnose to move relative to the flaperon from a stowed position to a retracted position to cause an opening to be defined between the flaperon and the wing, the first actuator and the second actuator carried by the wing.

9. The aircraft of claim 8, further including a coupler extending between the second actuator and the bullnose.

10. The aircraft of claim 8, wherein the second actuator is fixedly coupled to a rib of the wing.

11. The aircraft of claim 8, further including a hinge assembly, the flaperon to move via the hinge assembly, the hinge assembly disposed behind the trailing edge of the wing.

12. The aircraft of claim 8, wherein the second actuator is to cause the bullnose to move to the retracted position by moving the bullnose toward a trailing edge of the flaperon when the flaperon is in the downward deflected position.

13. The aircraft of claim 12, wherein the first actuator is to cause the flaperon to move to the upward deflected position, the bullnose in the retracted position when the flaperon is in the upward deflected position.

14. The aircraft of claim 8, further including a shroud, the shroud to cover at least a portion of the bullnose when the bullnose is in the stowed position.

15. A system comprising:
a control surface;
a bullnose moveable relative to the control surface;
a first actuator operatively coupled to the control surface;
a second actuator operatively coupled to the bullnose;
memory;
machine-readable instructions; and
processor circuitry to execute the machine-readable instructions to:
cause the first actuator to rotate the control surface about a hinge line between a neutral position and a downward deflected position relative to the neutral position; and
cause the second actuator to move the bullnose from an extended position to a retracted position via a coupler to create an opening relative to the control surface when the control surface is in the downward deflected position, the hinge line and an endpoint of the coupler coincident when the bullnose is in the retracted position.

16. The system of claim 15, wherein the processor circuitry is to cause the first actuator to rotate the control surface from the downward deflected position to the neutral position, the bullnose in the retracted position during the rotation of the control surface.

17. The system of claim 16, wherein the processor circuitry is to cause the first actuator to rotate the control surface from the neutral position to an upward deflected position relative to the neutral position, the bullnose in the retracted position when the control surface is in the upward deflected position.

18. The system of claim 15, wherein the control surface includes one of a flap or a flaperon, the bullnose proximate to a leading edge of the flap or the flaperon when the bullnose is in the extended position.

19. The apparatus of claim 2, further including a shroud, at least a portion of the bullnose covered by the shroud when the bullnose is in the first position.

20. The apparatus of claim 1, wherein the control surface is moveably coupled to a wing, the wing including a rib, at least a portion of the second actuator supported by the rib.

* * * * *